Patented Sept. 26, 1950

2,523,708

UNITED STATES PATENT OFFICE 2,523,708

ESTERS OF HYDROXYALKYL ETHERS OF CARBOHYDRATE GUMS

Owen A. Moe, Minneapolis, Minn., assignor to General Mills, Inc., a corporation of Delaware No Drawing. Application December 15, 1945, Serial No. 635,416

5 Claims. (Cl. 260—234)

The present invention relates to esters of mannan type carbohydrate gums and to a process of producing the same. The ester products of the present invention are novel and have unusual properties. They are soluble in the usual organic solvents such as acetone and ethylene dichloride. They may be cast from solution to prepare amazingly clear, flexible, and strong films which do not require the addition of a plasticizer. Some of the ester products described herein are extremely reactive and serve as intermediates for other reactions. The ester products of the present invention possess other unusual properties which make them useful in various applications.

The present invention also relates to a novel process of preparing these esters. Various well known standard methods of esterifying carbohydrates were attempted without success. For example, the procedure for esterification using the usual acetic acid-acetic anhydride acetylation bath recommended in U. S. Patent No. 1,861,209 for the acetylation of gum tragacanth was tried without success. Likewise, pretreatment of the gums with acetic acid and the catalyst did not proceed satisfactorily. Thus the usual methods of esterification failed when applied to the mannan type carbohydrate gum.

It was discovered that various gum intermediates could be esterified readily by treatment with the usual esterifying media. Thus it was found that formate esters of the gums and hydroxy alkyl ethers of the gums could be reacted with the usual esterifying media to produce esters of practically any degree of esterification. Moreover, a very important discovery was made when it was found that the gum endosperm could be employed directly in the esterification procedure. In the U. S. patent above identified the gum is used in the esterification process in the form of a fine powder. It is well known that gums of the mannan type are exceedingly difficult to reduce to a powder since many conventional grinding processes are without effect on the gum endosperm. Accordingly the discovery that the esterification by the present procedure can be employed on the whole endosperm or on particles of the endosperm of appreciable size, eliminates an expensive and cumbersome step required in the prior art practice.

It is, therefore, a primary object of the present invention to provide esters of mannan type gums having new and unusual properties. It is another object of the present invention to provide esters of reactive intermediate derivatives of mannan type gums. It is a further object of the present invention to provide a novel process of producing such esters.

These and other objects of the invention will be more fully apparent from the following description of the invention.

The intermediates previously described can be prepared in a simple manner. The gum formates may be prepared by simply allowing the gum to stand for an extended period of time in formic acid. A formic acid solution containing from 70–90% formic acid has been found to be desirable for this purpose. The gum formate thus formed may be suitably isolated from the reaction mixture, as for example by precipitation with acetone. The acetone and any excess formic acid may be suitably recovered from the filtrate by distillation, thus effecting an economical operation. The formate thus produced is insoluble in water. Gum derivatives having a formyl content of about 5% to about 19% have been found to be sufficiently reactive as to produce rapid and extensive esterification during subsequent processing.

The hydroxy alkyl gum ether derivatives likewise are reactive even at a relatively low degree of substitution. These are prepared preferably by first allowing the gum to stand for an extended period of time in an alkaline solution until appreciable swelling has occurred. The alkali gum may then be treated with an appropriate amount of etherifying agent such as an alkylene oxide or an alkylene halohydrin. These hydroxy alkyl gum ethers are usually water soluble. Moreover, where a polyhydroxyl alkyl etherifying agent is employed, additional hydroxyl groups may be introduced into the gum molecule and these additional hydroxyl groups may be subsequently esterified.

The subsequent esterification of the intermediate may be carried out in any of the well known ways, thus the usual mixture of an organic acid and its anhydride may be used either with or without the usual sulfuric or phosphoric acid catalyst. It is preferred, however, to employ a mixed catalyst such as a sulfuric-phosphoric acid mixture. Where the intermediate employed for subsequent esterification is an hydroxy alkyl ether, it appears that the hydroxy alkyl ether group remains in the molecule and that esterification takes place on the hydroxyl of the hydroxy alkyl ether group and/or directly on the glucose unit hydroxyls. Almost any degree of esterification can be attained. Practically complete esterification can be obtained if desired and without any undue difficulty.

When the intermediate employed for esterification is a formate and an acidic catalyst such as sulfuric acid is employed, it is frequently found that the formate groups are substantially removed. There is some evidence that a minor amount of formate may be retained.

The following examples will serve to illustrate the invention.

*Example 1*

Fifty parts of guar gum (finely milled) were mixed with 200 parts of approximately 90% formic acid (cooled to the freezing point) and the resulting mixture was stirred in order to prevent the lumping tendency. The reaction mixture was then frozen in a Dry Ice-acetone mixture. After freezing, the reaction mixture was removed and allowed to stand at room temperature overnight. The gum formate thus formed was precipitated by the addition of acetone, washed with acetone and finally dried in vacuo. The further esterification of this reactive intermediate was accomplished in the manner described below. Ten parts of the gum formate were added to a solution of 50 parts of acetic acid and 50 parts of acetic anhydride containing 0.6 part phosphoric acid and 0.015 part sulfuric acid. The resulting reaction mixture was heated in an oil bath and at 80° C. the mixture began to thicken, and at 110° C. fair clarity was obtained. When the temperature reached 120° C., the heat was removed (total heating time was approximately 30 minutes). The reaction mixture was fairly viscous and it was cooled to room temperature. The reaction product was isolated by precipitation with water. The product was then collected by filtration and dried in vacuo. A solution of the resulting gum ester and ethylene dichloride yielded a film of good clarity, flexibility, and strength without the addition of a plasticizer.

*Example 2*

Ten parts of guar gum formate (from Example 1) were mixed with a solution of 50 parts of propionic anhydride and 50 parts of propionic acid containing 0.6 part phosphoric acid and 0.015 part of sulfuric acid. The resulting reaction mixture was heated with stirring in an oil bath. When the temperature had increased to 103° C., the mixture began to thicken and when the temperature had reached 120° C., the reaction mixture was substantially clear. The source of heat was removed and after cooling, the reaction product was precipitated by pouring the reaction mixture into ether. The gum propionate thus prepared was collected by filtration and dried in vacuo. A solution of this guar gum propionate and ethylene dichloride yielded films of good clarity which displayed excellent flexibility and strength. These films possessed a somewhat softer texture when they were plasticized with a plasticizer such as dibutyl phthalate. However, it was not necessary to plasticize these films in order to obtain excellent flexibility.

*Example 3*

Twenty-five grams of guar gum finely milled were mixed with a solution of formic acid-acetic acid containing a small amount of water. (This formic acid-acetic acid mixture was prepared as follows: 100 parts of formic acid (90%) was mixed with 34 parts of acetic anhydride. This leaves approximately four parts of water in the mixture.) The resulting reaction mixture was allowed to stand overnight at room temperature. The gum derivative was precipitated by the addition of acetone. After working up in acetone, the partial ester was dried in vacuo.

Ten grams of the above gum formate were mixed with 50 parts of acetic acid containing 0.015 part of sulfuric acid and 0.6 part of phosphoric acid and 50 parts of acetic anhydride. The resulting reaction mixture was heated in an oil bath and, when the temperature had reached 90° C., the mixture started to thicken and clear. At 105° C. the reaction was substantially clear; however, heat was applied until the temperature increased to 120° C. The reaction mixture displayed very good viscosity and, after cooling, it was diluted with acetone. A white fibrous precipitate resulted when this cooled mixture was poured into water. The collected product was treated in the usual manner. The film formed by casting a solution of this gum ester in ethylene dichloride was clear, flexible, and strong. The propionate ester prepared in a manner similar to that described above yielded very excellent films. In fact, it was observed that with 40% dibutyl phthalate as plasticizer, the film remained clear and strong with increased flexibility and a pronounced softness in texture.

*Example 4*

Ten parts of guar gum endosperm were mixed with 90 parts of formic acid (90%). This mixture was permitted to stand at room temperature for four hours when appreciable swelling had commenced. It was heated to 45° C. for 50 minutes and then allowed to stand at room temperature overnight. The reaction mixture became very thick and, after thoroughly mixing, became smooth and uniform. This procedure is in reality more simple than the one using the finely milled gum since there is no dispersion problem. The gum formate was precipitated by the addition of acetone and worked up in a known manner. The preparation of the gum acetate was accomplished in the manner described below.

Eight parts of the above gum formate were added to an acetylation bath consisting of 40 parts acetic acid, 40 parts acetic anhydride, 0.015 part sulfuric acid and 0.6 part of phosphoric acid. The resulting mixture was heated in an oil bath to the reflux temperature. After one minute, the reaction appeared to be complete except for the presence of some extraneous material. The mixture was cooled to room temperature and diluted with acetone. The extraneous materials were removed by filtration and the filtrate was a clear solution, nearly water-white in color. The filtrate was poured into water with stirring and the esterification product precipitated as a white material. This reaction product was treated in a known manner. The gum ester thus prepared was soluble in acetone and the chlorinated hydrocarbons, such as ethylene dichloride, chloroforms, etc. It formed an extremely clear, smooth and very viscous 5% solution in ethylene dichloride. The films formed from solutions of this type were excellent. The films possessed very good clarity and flexibility and exceptional strength. Four parts of the above gum ester were saponified in dilute sodium hydroxide solution. The deacetylation was rapid as noted by the ready formation of a clear solution. After complete solubility, the reaction product was precipitated by methanol, and a white product was obtained, washed with absolute methanol and dried in vacuo. To all appearances, this regenerated gum is a very pure mannogalactan and dissolves in water to yield water clear sols. These sols form very clear and firm gels upon the addition of borate solutions. It is possible to prepare very clear and very viscous 10% sols of this pure regenerated mannogalactan, and the films formed from these solutions were clear and strong with good flexibility.

*Example 5*

Ten parts of locust bean gum were mixed with 40 parts of cold (5–10° C.) 90% formic acid. The gum dispersed easily and the mixture thickened almost immediately. Reaction mixture was allowed to stand overnight at room temperature and then the gum formate was precipitated by the addition of acetone and worked up in the usual manner. The preparation of the acetate of this reactive locust bean intermediate was accomplished as described below.

Nine parts of the above formate were mixed with a solution containing 50 parts of acetic acid, 50 parts of acetic anhydride, 0.015 part sulfuric acid and 0.6 part phosphoric acid. The above reaction mixture was heated to 110° C. when the mixture started to thicken. However, it was still cloudy and the heating was continued until the temperature had increased to 120° C. and maintained at this temperature for 10 minutes when a substantially clear solution resulted. After cooling, the reaction mixture was diluted with acetone and poured into cold water. The fibrous material which precipitated was worked up in a known manner. This locust bean gum ester was substantially soluble in ethylene dichloride and formed a film possessing fair flexibility and strength.

*Example 6*

Twenty-seven parts of guar gum were thoroughly mixed with a cold (5–10° C.) solution of 13.3 parts of sodium hydroxide and 50 parts of water. After thorough mixing, an additional 150 parts of water was added. This mixture was heated in a water bath at 80° C. for ½ hour and then treated by mixing with 34 parts of ethylene chlorohydrin. The resulting reaction mixture was heated at 65–80° C. for a period of 90 minutes with mixing. An additional hundred parts of water was added during this heating period. After heating, the reaction mixture was diluted with 500 parts of water and the product was isolated following a known procedure. This reactive water soluble hydroxyalkyl gum ether was esterified in the following manner.

Ten parts of the above hydroxyalkyl gum ether were mixed with a solution containing 50 parts of acetic acid, 50 parts of acetic anhydride and the usual amount of mixed catalyst. The resulting reaction mixture was heated to 120° C. when 0.015 part of sulfuric acid was added and, after an additional 10 minutes at this temperature, the reaction appeared to be substantially complete. After cooling, the reaction mixture was poured into cold water and the product which precipitated was collected and dried in vacuo. This guar gum mixed ether ester was soluble in ethylene dichloride and acetone except for a few extraneous particles. The filtered ethylene dichloride solution yielded excellent films which displayed good clarity, strength, and flexibility.

*Example 7*

Twenty-seven parts of locust bean gum were added to an alkaline solution at 5–10° C. containing 13.3 g. of sodium hydroxide and 50 parts of water. This mixture was thoroughly mixed and 150 parts of water were added. The resulting reaction mixture was heated in a water bath for a period of 20 minutes at 65–70° C. Thirty-seven parts of glycerol monochlorohydrin were thoroughly incorporated and the resulting mixture was heated in a water bath for a period of two hours at 65–80° C. An additional portion of water (100 parts) was added and the heating was continued for an additional hour. After dilution with water, the reaction product was isolated by precipitation with methanol and dried. The esterification of this water soluble polyhydroxyalkyl gum ether wherein an additional hydroxyl group has been introduced was accomplished in a manner described below.

Ten parts of the above dihydroxypropyl locust bean gum ether were mixed with the usual acetylation bath. The resultant reaction mixture was heated in an oil bath with stirring. When the temperature had increased to 90–100° C., the mixture became very thick. Fifty parts of acetic anhydride were added and in 10 minutes the reaction mixture was substantially clear and very viscous. An additional portion of sulfuric acid (0.015 part) was added and after heating at 125° for 10 minutes the reaction mixture was cooled. After filtration, the reaction product was isolated by precipitation in water. The gum ester thus obtained was washed thoroughly in water and dried in vacuo. This mixed ether ester was readily soluble in the usual organic solvents and yielded an extremely clear, smooth and viscous solution. The films formed from solutions of this type were indeed excellent, and even the unplasticized films possessed good clarity and strength and surprising flexibility.

*Example 8*

Twenty-seven parts of iles mannan gum (flour) were mixed with an alkaline solution containing 13.3 parts of sodium hydroxide and 50 parts of water. After thorough mixing 150 parts of water were added and the non-viscous mixture was heated to 65° C. when it became very thick. After heating for 20 minutes, 37 parts of glycerol monochlorohydrin were added. The heating was continued for a period of 105 minutes at 70–75° C. The reaction product was isolated in the usual manner. This polyhydroxyalkyl iles mannan gum ether was esterified in the manner described below.

Ten parts of the above gum intermediate were mixed with the usual acetylation bath. The resultant reaction mixture was heated in an oil bath with stirring. The mixture thickened when the temperature reached 95° C. and at 120° C. it started to clear and became extremely thick. After heating for 10 minutes at 120° C., a solution containing 25 parts of acetic acid and 25 parts acetic anhydride was added in order to alleviate the extremely viscous nature of the mixture. This resulting solution was heated for an additional 10 minutes at 120° C. The product was isolated by precipitation in water and worked up in the usual manner. This gum ether ester was substantially soluble in ethylene dichloride. A solution of the derivative in ethylene dichloride was filtered and the filtrate yielded exceptionally good non-plasticized films. The films were clear and displayed good flexibility and strength.

Example 9

A dihydroxypropyl guar gum ether was prepared as described in Example 7, and it was esterified in a manner similar to those previously described. A prepared solution of this esterification product yielded an exceptional film with good flexibility, clarity and strength.

Example 10

Twenty parts of guar gum endosperm were soaked for five hours in 200 parts of a 10% sodium hydroxide solution. The endosperm sections swelled to an appreciable extent in the alkaline media and the liquid phase was dark in color indicating that it had removed all of the undesirable color from the gum endosperm. The endosperm sections were then washed repeatedly with water in order to flush off the extraneous material such as seed coat and the like and to remove the last traces of color. All of the free water was removed by decantation and an alkaline solution containing 13.3 parts of sodium hydroxide and 50 parts of water was added. The resultant alkali-gum mixture was heated on a steam bath for 2 hours with efficient mixing and then permitted to stand overnight at room temperature. This alkali-gum mixture was a rubbery semi-solid and was ground in a mortar in order to rupture all of the gum endosperms. Thirty grams of glycerol monochlorohydrin were thoroughly mixed in with the alkali gum and the resultant mixture was heated at 45–60° C. for a period of five hours. After heating for two hours, 100 parts of water were worked into the reaction mixture. After the five-hour heating period had been completed, the reaction mixture was diluted with 200 parts of water and the product was precipitated after neutralization by the addition of methanol. The precipitated product was washed and ground with methanol, collected by filtration, and dried in vacuo. In essentially the same manner the hydroxyethyl guar gum ether may be prepared using the endosperm sections as the initial starting material. The esterification to yield a mixed ester of this dihydroxypropyl gum ether resulting from guar gum endosperm was accomplished as indicated below.

Eight grams of the above polyhydroxyalkyl gum ether were mixed with an acetylation mixture consisting of 40 parts of acetic acid, 40 parts of propionic anhydride, 0.03 part of sulfuric acid, and 0.6 part of phosphoric acid. The resulting reaction mixture was heated in an oil bath and when the temperature reached 105° C., the mixture began to thicken and clear. The reaction was very rapid and, after a few minutes, the reaction mixture was cooled to room temperature and diluted with acetone. A small amount of extraneous material was observed; hence, the reaction mixture was filtered. A small amount of residue was noted. The filtrate, which was clear and nearly water-white in color, was poured into an excess of water. The esterification product thus precipitated was worked up in the usual manner and dried in vacuo. When the mixed acetate propionate thus prepared was dissolved in ethylene dichloride, an extremely smooth, clear, and viscous solution resulted. The ethylene dichloride solution was water-white in color. The films formed from solutions of this type displayed good flexibility, clarity, and strength, even in the absence of plasticizers.

Example 11

Five parts of guar gum formate prepared in a manner similar to that previously outlined were mixed with 200 parts of anhydrous pyridine. The resulting mixture was heated to 60° C. with vigorous stirring. Then 14 parts of pure benzoyl chloride were added dropwise with stirring. After the addition of the acid chloride was complete, the temperature of the reaction mixture was increased to 95° C. and maintained at this temperature for a period of three hours. The resulting reaction mixture was poured into a large excess of cold water and the product thus precipitated was collected and washed with alcohol. The reaction product was then washed with ethanol containing a small amount of acetic acid followed by washings with water, ethanol and ether. After drying, the gum benzoate thus obtained was substantially soluble in warm ethylene dichloride and the film formed by casting a portion of this solution on a glass plate was flexible and showed fair strength.

In a somewhat similar manner it is possible to prepare other aromatic esters of the mannogalactan gums as well as the higher fatty acid esters such as palmitate and stearate.

While various modifications of the invention have been described, it is apparent that numerous variations are possible. In general, the invention is applicable to all mannan types of gum such as guar, locust bean gum, iles mannan, flame tree, honey locust, tara, and the like, all of which produce mannose on hydrolysis. These gums are referred to in the claims as mannan gums. Likewise, considerable latitude is possible in the type of derivative; thus mono- or polyhydroxyl alkyl ethers of almost unlimited variety may be used. Similarly, wide latitude is possible in the nature of the ester group subsequently introduced into the intermediate. Preferably, the ester group is derived from a fatty acid having from two to eighteen carbon atoms, although other acid groups such as aromatic acids, as for example, benzoate, naphthoate, etc., may be used. All the usual esterification catalysts can be employed with varying degrees of success. Acidic catalysts such as sulfuric acid, perchloric acid, and phosphoric acid, are acceptable. The mixed sulfuric-phosphoric acid catalyst previously described is preferred as it yields esterification products displaying excellent film formation. Other variations include the ratio of reactants depending upon the extent of reaction desired and time and temperature. In general, elevated temperatures are preferred since the reaction period is then comparatively short and the products obtained are of excellent quality.

The products of the present invention are unusual in numerous respects, thus for example, the acetates and propionates prepared from the guar gum through the intermediate of the acid formate, were soluble in ketones such as acetone, and in chlorinated hydrocarbons such as ethylene dichloride. The films formed by casting a solution of the gum ester in ethylene dichloride were amazingly clear, flexible, and strong. Plasticizers are usually not necessary in the film. As a matter of fact, it was found that the films formed from the acetate derivatives appeared to approximate the films formed from the propionate esters as far as flexibility was concerned.

While various modifications of the invention have been described in detail, it is to be understood that the invention is not limited thereto but may be varied within the scope of the following claims.

I claim as my invention:

1. A fatty acid ester of a polyhydroxy alkyl ether of a mannan gum.

2. A fatty acid ester of a hydroxy alkyl ether of a mannan gum.

3. Process of producing a fatty acid ester of a mannan gum which comprises reacting the gum with alkali, reacting the alkali gum derivative with an etherifying agent selected from the group consisting of alkylene oxides and alkylene halohydrins to form a hydroxyalkyl ether of the gum, and then reacting said ether with a fatty acid esterifying agent to produce the fatty acid ester of the gum.

4. An acetic acid ester of a dihydroxypropyl ether of a mannan gum.

5. An acetic acid ester of a hydroxyethyl ether of a mannan gum.

OWEN A. MOE.

REFERENCES CITED

The following references are of record in the file of this patent:

UNITED STATES PATENTS

| Number | Name | Date |
|---|---|---|
| 1,861,209 | Davis | May 31, 1932 |
| 1,876,920 | Hagedorn et al. | Sept. 13, 1932 |
| 2,190,179 | Ziese et al. | Feb. 13, 1940 |
| 2,387,157 | Koppenhoefer | Oct. 16, 1945 |

FOREIGN PATENTS

| Number | Country | Date |
|---|---|---|
| 535,949 | Great Britain | Apr. 28, 1941 |

OTHER REFERENCES

Chemical Abstracts, vol. 22, p. 3987$^6$.